United States Patent
Chen et al.

(10) Patent No.: US 12,068,008 B2
(45) Date of Patent: *Aug. 20, 2024

(54) MAGNETIC FLUX GUIDING DEVICE WITH SPIN TORQUE OSCILLATOR (STO) FILM HAVING NEGATIVE SPIN POLARIZATION LAYERS IN ASSISTED WRITING APPLICATION

(71) Applicant: Headway Technologies, Inc., Milpitas, CA (US)

(72) Inventors: Wenyu Chen, San Jose, CA (US); Shohei Kawasaki, Sunnyvale, CA (US); Tetsuya Roppongi, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,975

(22) Filed: Jan. 30, 2023

(65) Prior Publication Data
US 2023/0178103 A1 Jun. 8, 2023

Related U.S. Application Data

(63) Continuation of application No. 17/538,391, filed on Nov. 30, 2021, now Pat. No. 11,568,891.

(51) Int. Cl.
*G11B 5/235* (2006.01)
*G11B 5/11* (2006.01)
(Continued)

(52) U.S. Cl.
CPC .............. *G11B 5/3146* (2013.01); *G11B 5/11* (2013.01); *G11B 5/1278* (2013.01); *G11B 5/235* (2013.01);
(Continued)

(58) Field of Classification Search
None
See application file for complete search history.

(56) References Cited

U.S. PATENT DOCUMENTS

| 6,785,092 B2 | 8/2004 | Covington et al. |
| 10,937,450 B1 | 3/2021 | Kawasaki et al. |

(Continued)

OTHER PUBLICATIONS

Valet, T. et al., "Theory of the Perpendicular Magnetoresistance in Magnetic Multilayers", Physical Review B, vol. 48, No. 10, pp. 7099-7113, Sep. 1993.
(Continued)

*Primary Examiner* — Craig A. Renner
(74) *Attorney, Agent, or Firm* — DLA Piper LLP (US)

(57) ABSTRACT

A STRAMR structure is disclosed. The STRAMR structure can include a spin torque oscillator (STO) device in a WG provided between the mail pole (MP) trailing side and a trailing shield. The STO device, includes: a flux guiding layer that has a negative spin polarization (nFGL) with a magnetization pointing substantially parallel to the WG field without the current bias and formed between a first spin polarization preserving layer (ppL1) and a second spin polarization preserving layer (ppL2); a positive spin polarization (pSP) layer that adjoins the TS bottom surface; a non-spin polarization preserving layer (pxL) contacting the MP trailing side; a first negative spin injection layer (nSIL1) between the ppL2 and a third spin polarization preserving layer (ppL3); and a second negative spin injection layer (nSIL2) between the ppL3 and the pxL, wherein the nFGL, nSIL1, and nSIL2 have a spin polarization that is negative.

14 Claims, 16 Drawing Sheets

(51) Int. Cl.
    *G11B 5/127*    (2006.01)
    *G11B 5/31*     (2006.01)
    *G11B 5/00*         (2006.01)
    *G11B 5/39*         (2006.01)

(52) U.S. Cl.
    CPC ............ *G11B 5/3133* (2013.01); *G11B 5/314* (2013.01); *G11B 5/3163* (2013.01); *G11B 2005/0024* (2013.01); *G11B 5/3912* (2013.01); *G11B 5/3919* (2013.01); *G11B 2005/3996* (2013.01)

(56) References Cited

U.S. PATENT DOCUMENTS

| | | |
|---|---|---|
| 11,257,514 B2 | 2/2022 | Freitag et al. |
| 11,568,891 B1 | 1/2023 | Chen et al. |
| 2008/0019040 A1 | 1/2008 | Zhu et al. |
| 2016/0086623 A1 | 3/2016 | Nagasaka et al. |
| 2018/0075868 A1 | 3/2018 | Koui et al. |
| 2018/0261241 A1 | 9/2018 | Narita et al. |
| 2021/0104257 A1 | 4/2021 | Iwasaki et al. |
| 2021/0375309 A1 | 12/2021 | Iwasaki et al. |
| 2021/0375312 A1 | 12/2021 | Narita et al. |
| 2021/0407534 A1 | 12/2021 | Freitag et al. |
| 2022/0005497 A1 | 1/2022 | Takagishi et al. |
| 2022/0068299 A1 | 3/2022 | Iwasaki et al. |

OTHER PUBLICATIONS

Zhu, J. et al., "Microwave Assisted Magnetic Recording", IEEE Transactions on Magnetics, vol. 44, No. 1, pp. 125-131, Jan. 2008.
Office Action in U.S. Appl. No. 17/538,391, dated Mar. 30, 2022.
Notice of Allowance in U.S. Appl. No. 17/538,391, dated Sep. 15, 2022.

MAGNETIC FLUX GUIDING DEVICE WITH SPIN TORQUE OSCILLATOR (STO) FILM HAVING NEGATIVE SPIN POLARIZATION LAYERS IN ASSISTED WRITING APPLICATION

CROSS REFERENCE TO RELATED APPLICATIONS

This application is a continuation of U.S. application Ser. No. 17/538,391, filed Nov. 30, 2021, the entire disclosure of which is hereby incorporated by reference.

TECHNICAL FIELD

Embodiments of the present disclosure relate generally to a design for a spin torque (STO) device in a write gap (WG) between a main pole (MP) and trailing shield (TS) that enables spin transfer torque reversal assisted magnetic recording (STRAMR).

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. One approach that is currently being investigated is microwave assisted magnetic recording (MAMR). In this scheme, a field generator is placed in close proximity to the write element to produce a high frequency oscillating field in the media film plane. The frequency range of the oscillating field could be from 5 GHz to 50 GHz. Because of ferromagnetic resonance (FMR), it becomes possible to switch media grains at fields below their normal coercivity i.e. a lower write field may be used, but only in the immediate vicinity of the microwave assisted write element.

The microwave field generator typically is made of a spin torque oscillator (STO), which resembles a current-perpendicular-to-plane (CPP) GMR or TMR structure in that the current flows perpendicular to the film, although the magnetization directions in the stack are different from those of a CPP GMR/TMR sensor. US patent application US2008/0019040A1 (Zhu et al.) provides details of the STO stack structure.

Spin transfer torque devices (also known as STO) are based on a spin-transfer effect that arises from the spin dependent electron transport properties of ferromagnetic (FM)-spacer-FM multilayers. When a spin-polarized current passes through a magnetic multilayer in a CPP (current perpendicular to plane) configuration, the spin angular moment of electrons from a first FM layer (FM1) that are incident on a second FM layer (FM2) interacts with magnetic moments of FM2 near the interface between the FM2 and non-magnetic spacer. Through this interaction, the electrons transfer a portion of their angular momentum to FM2. As a result, spin-polarized current can switch the FM2 magnetization direction if the current density is sufficiently high. STO devices are also referred to as spintronic devices and have FM layers that may have a perpendicular magnetic anisotropy (PMA) component where magnetization is aligned substantially perpendicular to the plane of FM1 and FM2. However, unlike Magnetoresistive Random Access Memory (MRAM) where PMA is necessary to keep magnetization perpendicular to plane in a free layer and reference layer, for example, STO devices in MAMR and related applications have a sufficiently strong WG field to align magnetization in FM layers without requiring inherent PMA in the FM layers.

MAMR typically operates with the application of a bias current across the STO device and between the TS and MP in order to apply spin torque on an oscillation layer (OL) so that the OL's oscillation generates a high frequency RF field. The RF field induces a precessional state and lower coercivity in a magnetic bit to be written in a magnetic medium. Simultaneously, a MP write field is applied from an air bearing surface (ABS) to the magnetic medium, and lower field strength is needed to write the bit because of the RF field assist. In spin-torque-assisted FGL reversal schemes, FGL magnetization flips to an opposite direction when the applied current across the STRAMR device is sufficiently large thereby increasing the WG reluctance, which causes a greater MP write field output. Both MAMR and STRAMR typically require a relatively high current density ($>10^8$ A/cm$^2$) in order to apply a useful spin torque effect for generating a RF field or for FGL flipping. Since the required applied current for optimum FGL flipping is near the maximum value that can be tolerated to ensure good device reliability, there is a need to design an improved STRAMR scheme that operates efficiently with a considerable reduction in applied current density. There also is a need to design is desirable an improved STRAMR scheme that enables a greater write field enhancement as a result of a greater degree of FGL magnetization flipping at a given current density.

SUMMARY

Broadly, embodiments of the present disclosure provide a STO device operating in a STRAMR scheme that enables a larger spin-torque-induced reversal effect on a FGL magnetization at a given bias current density, or alternatively, for a desired amount of FGL flipping, the required bias current density may be reduced for improved STO device reliability. In some embodiments, the STO device operating in a STRAMR scheme provides a reduced bit error rate (BER).

A spin transfer torque reversal assisted magnetic recording (STRAMR) structure is disclosed herein. In some embodiments according to the present disclosure, the STRAMR structure can include: (a) a main pole (MP) that is configured to generate a write field which is directed through a pole tip at an air bearing surface (ABS), and to generate a write gap (WG) field in a down-track direction across a spin torque oscillator (STO) device in a WG, and between a MP trailing side and a trailing shield; (b) the trailing shield (TS) with a side at the ABS, and a bottom surface facing the MP; and (c) the STO device, comprising: (1) a flux guiding layer that has a negative spin polarization (nFGL) with a magnetization pointing substantially parallel to the WG field without the current bias and formed between a first spin polarization preserving layer (ppL1) and a second spin polarization preserving layer (ppL2); (2) a positive spin polarization (pSP) layer that adjoins the TS bottom surface; (3) a non-spin polarization preserving layer (pxL) contacting the MP trailing side; (4) a first negative spin injection layer (nSIL1) between the ppL2 and a third spin polarization preserving layer (ppL3); and (5) a second negative spin injection layer (nSIL2) between the ppL3 and the pxL, wherein the nFGL, nSIL1, and nSIL2 have a spin polarization that is negative, and wherein the STO device is configured so that when a direct current (DC) of sufficient current density (J) is applied from the TS to MP across the STO device, the nSIL1 and nSIL2 exert an additive spin torque on the nFGL to cause the nFGL magnetization to flip to a direction substantially antiparallel to the WG field thereby increasing reluctance in the WG and enhancing the write field.

In some embodiments, the nSIL1 and nSIL2 have a saturation magnetization×thickness (Mst) product substantially less than that of the nFGL.

In some embodiments, the pxL is an alloy or multilayer made of one or more of Cr, Ir, NiCr, Ta, W, Pt, Pd, Rh, Ti and Ru such that a net spin polarization in electrons transiting the pxL is effectively lost.

In some embodiments, the ppL1, the ppl2, and the ppL3 are one or more of Cu, Au, Ag, Ru, Al, Cr, V, or alloys thereof, and having sufficient spin diffusion length to allow spin polarization in essentially an unaltered orientation for electrons traversing through the ppL1, the ppl2, and the ppL3.

In some embodiments, at least one of the nSIL1, the nSIL2, and the nFGL is a negative spin polarization material with a spin polarization from −0.4 to 0, and is made of an alloy that is of one or more of Fe, Co, and Ni with Cr, V, and Mn, or a multilayer thereof.

In some embodiments, the pSP layer has a magnetization ferromagnetically coupled to the TS, and substantially aligned in the WG field direction with or without the application of the DC across the STO device.

In some embodiments, each of the pSP layer, the nFGL, the nSIL1, and the nSIL2 have a saturation magnetization (Ms) from 6 kiloGauss (kG) to 15 kG, and a thickness from 1 to 4 nm.

In some embodiments, the STO device has a pxL/nSIL2/ppL3/nSIL1/ppL2/nFGL/ppL1/pSP layer configuration.

In some embodiments, the STO device further comprises a third negative spin injection layer (nSIL3) and a fourth spin polarization preserving layer (ppL4) to provide a pxL/nSIL3/ppL4/nSIL2/ppL3/nSIL1/ppL2/nFGL/ppL1/pSP layer configuration.

A head gimbal assembly (HGA) is also disclosed herein. In some embodiments, the HGA includes (a) the STRAMR structure according to some embodiments of the present disclosure, and (b) a suspension that elastically supports the STRAMR structure, wherein the suspension has a flexure to which the STRAMR structure is joined, a load beam with one end connected to the flexure, and a base plate connected to the other end of the load beam.

A magnetic recording apparatus is also disclosed herein. In some embodiments, the magnetic recording apparatus includes: (a) the HGA according to some embodiments of the present disclosure; (b) a magnetic recording medium positioned opposite to a slider on which the STRAMR structure is formed; (c) a spindle motor that rotates and drives the magnetic recording medium; and (d) a device that supports the slider, and that positions the slider relative to the magnetic recording medium.

A second STRAMR structure is disclosed herein. In some embodiments according to the present disclosure, the STRAMR structure can include: (a) a main pole (MP) that is configured to generate a write field which is directed through a pole tip at an air bearing surface (ABS), and to generate a write gap (WG) field in a down-track direction across a spin torque oscillator (STO) device in a WG, and between a MP trailing side and a trailing shield; (b) the trailing shield (TS) with a side at the ABS, and a bottom surface facing the MP; and (c) the STO device, comprising: (1) a lux guiding layer that has a negative spin polarization (nFGL) with a magnetization substantially parallel to the WG field without the current bias, and formed between a first spin polarization preserving layer (ppL1) and a second spin polarization preserving layer (ppL2); (2) a positive spin polarization (pSP) layer that adjoins the MP trailing side; (3) a non-spin polarization preserving layer (pxL) contacting the TS; (4) a first negative spin injection layer (nSIL1) between the ppL2 and a third spin polarization preserving layer (ppL3); and (5) a second negative spin injection layer (nSIL2) between the ppL3 and the pxL, wherein the nFGL, nSIL1, and nSIL2 have a spin polarization that is negative, and wherein the STO device is configured so that when a direct current (DC) of sufficient current density (J) is applied from the TS to MP across the STO device, the nSIL1 and nSIL2 exert an additive spin torque on the nFGL to cause the nFGL magnetization to flip to a direction substantially antiparallel to the WG field thereby increasing reluctance in the WG and enhancing the write field.

In some embodiments, the nSIL1 and nSIL2 have a saturation magnetization×thickness (Mst) product substantially less than that of the nFGL.

In some embodiments, the pxL is an alloy or multilayer made of one or more of Cr, Ir, NiCr, Ta, W, Pt, Pd, Rh, Ti and Ru such that a net spin polarization in electrons transiting the pxL is effectively lost.

In some embodiments, the ppL1, the ppl2, and the ppL3 are one or more of Cu, Au, Ag, Ru, Al, Cr, V, or alloys thereof, and having sufficient spin diffusion length to allow spin polarization in essentially an unaltered orientation for electrons traversing through the ppL1, the ppl2, and the ppL3.

In some embodiments, at least one of the nSIL1, the nSIL2, and the nFGL is a negative spin polarization material with a spin polarization from −0.4 to 0, and is made of an alloy that is of one or more of Fe, Co, and Ni with Cr, V, and Mn, or a multilayer thereof.

In some embodiments, the pSP layer has a magnetization ferromagnetically coupled to the TS, and substantially aligned in the WG field direction with or without the application of the DC across the STO device.

In some embodiments, each of the pSP layer, the nFGL, the nSIL1, and the nSIL2 have a saturation magnetization (Ms) from 6 kiloGauss (kG) to 15 kG, and a thickness from 1 to 4 nm.

In some embodiments, the STO device has a pxL/nSIL2/ppL3/nSIL1/ppL2/nFGL/ppL1/pSP layer configuration.

In some embodiments, the STO device further comprises a third negative spin injection layer (nSIL3) and a fourth spin polarization preserving layer (ppL4) to provide a pxL/nSIL3/ppL4/nSIL2/ppL3/nSIL1/ppL2/nFGL/ppL1/pSP layer configuration.

A head gimbal assembly (HGA) is also disclosed herein. In some embodiments, the HGA includes (a) the STRAMR structure according to some embodiments of the present disclosure, and (b) a suspension that elastically supports the STRAMR structure, wherein the suspension has a flexure to which the STRAMR structure is joined, a load beam with one end connected to the flexure, and a base plate connected to the other end of the load beam.

A magnetic recording apparatus is also disclosed herein. In some embodiments, the magnetic recording apparatus includes: (a) the HGA according to some embodiments of the present disclosure; (b) a magnetic recording medium positioned opposite to a slider on which the STRAMR structure is formed; (c) a spindle motor that rotates and drives the magnetic recording medium; and (d) a device that supports the slider, and that positions the slider relative to the magnetic recording medium.

BRIEF DESCRIPTION OF THE DRAWINGS

The accompanying drawings, which are incorporated in and constitute a part of this specification, exemplify various embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not generally drawn to scale.

DETAILED DESCRIPTION

Figure 1:
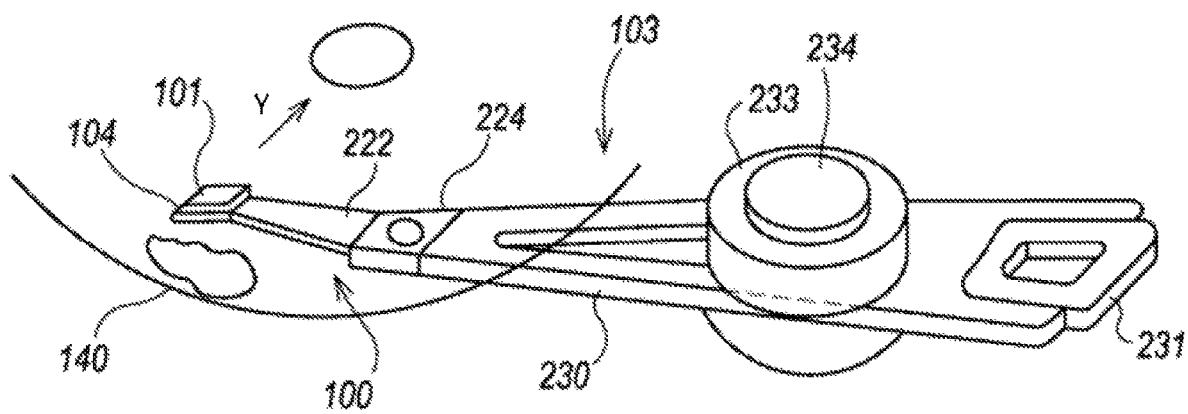
FIG. 1 is a perspective view of a head arm assembly according to some embodiments of the present disclosure.

The present disclosure provides a writer structure wherein a STO device that enables both of a STRAMR effect for FGL flipping, and a MAMR assist for writing on adjacent magnetic bits in a magnetic medium, is formed between a main pole and a trailing shield. In the drawings, the y-axis is in a cross-track direction, the z-axis is in a down-track direction, and the x-axis is in a direction orthogonal to the ABS and towards a back end of the writer structure. Thickness refers to a substantially down-track distance. It should be understood that thickness is the direction perpendicular to the film plane, typically 0~30 degrees from the z-axis direction to create a MP surface slope in most of current writers. Width is a cross-track distance, and height is a distance from the ABS in the x-axis direction. In some of the drawings, a magnetic bit is considerably enlarged over actual size in order to more easily depict a magnetization therein. The term "higher degree of flipping" means that FGL magnetization is flipped closer to a direction that is antiparallel to the WG magnetic field. A "weak" positive spin polarization is defined as a spin polarization that is from 0 up to 0.3 while a negative spin polarization according to the present disclosure is typically from −0.4 to 0.

Referring to FIG. 1, a head gimbal assembly (HGA) 100 includes a magnetic recording head 101 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
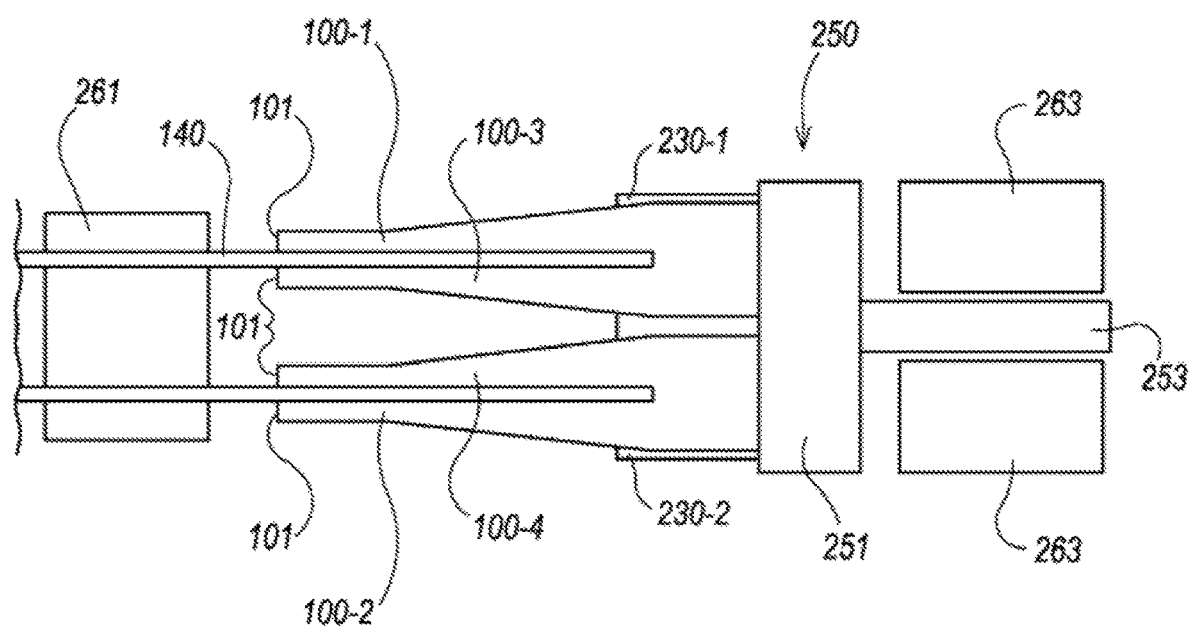
FIG. 2 is side view of a head stack assembly according to some embodiments of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a plurality of HGAs (HGA 100-1 and second HGA 100-2 are at outer positions while HGA 100-3 and HGA 100-4 are at inner positions) is mounted to arms 230-1, 230-2, respectively, on carriage 251. A HGA is mounted on each arm at intervals so as to be aligned in the perpendicular direction (orthogonal to magnetic medium 140). The coil portion 253 of the voice coil motor is mounted at the opposite side of each arm in carriage 251. The voice coil motor has a permanent magnet 263 arranged at an opposite position across the coil 253.

Figure 3:
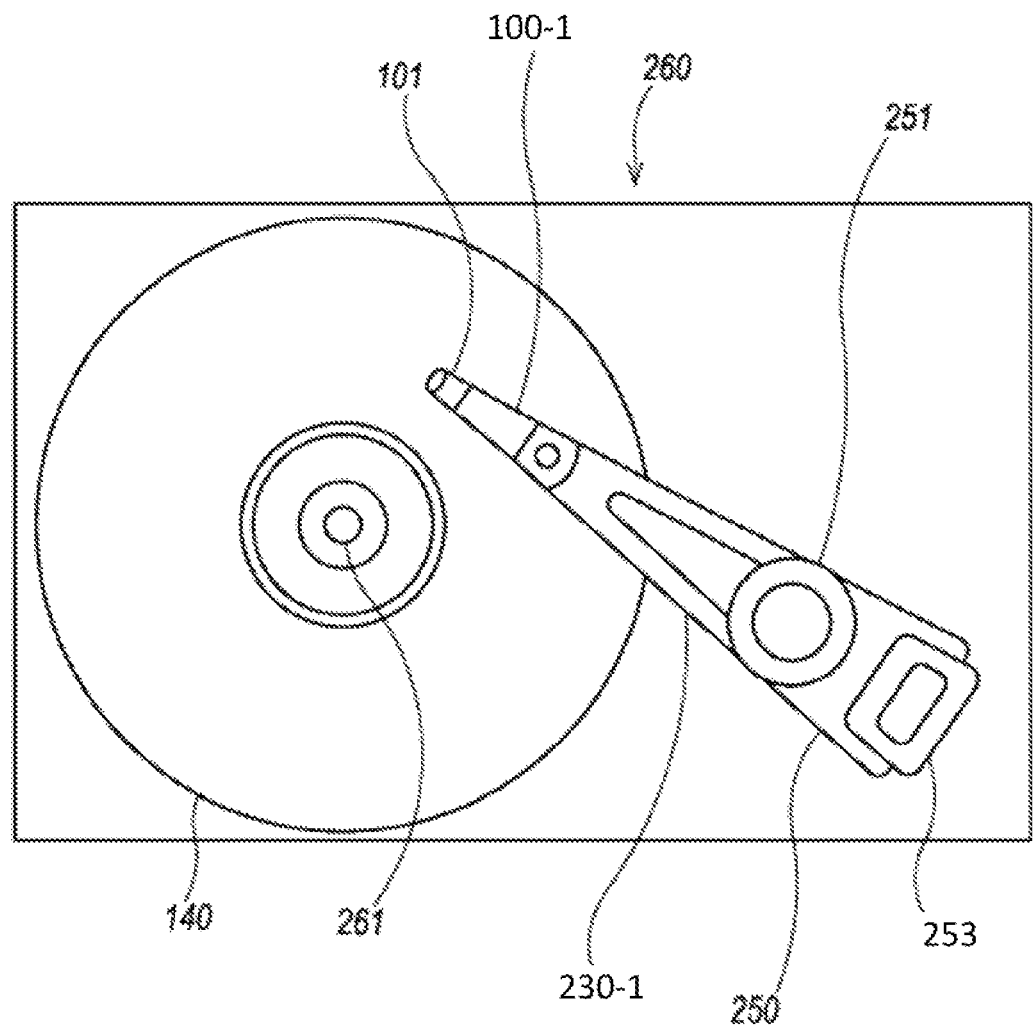
FIG. 3 is a plan view of a magnetic recording apparatus according to some embodiments of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
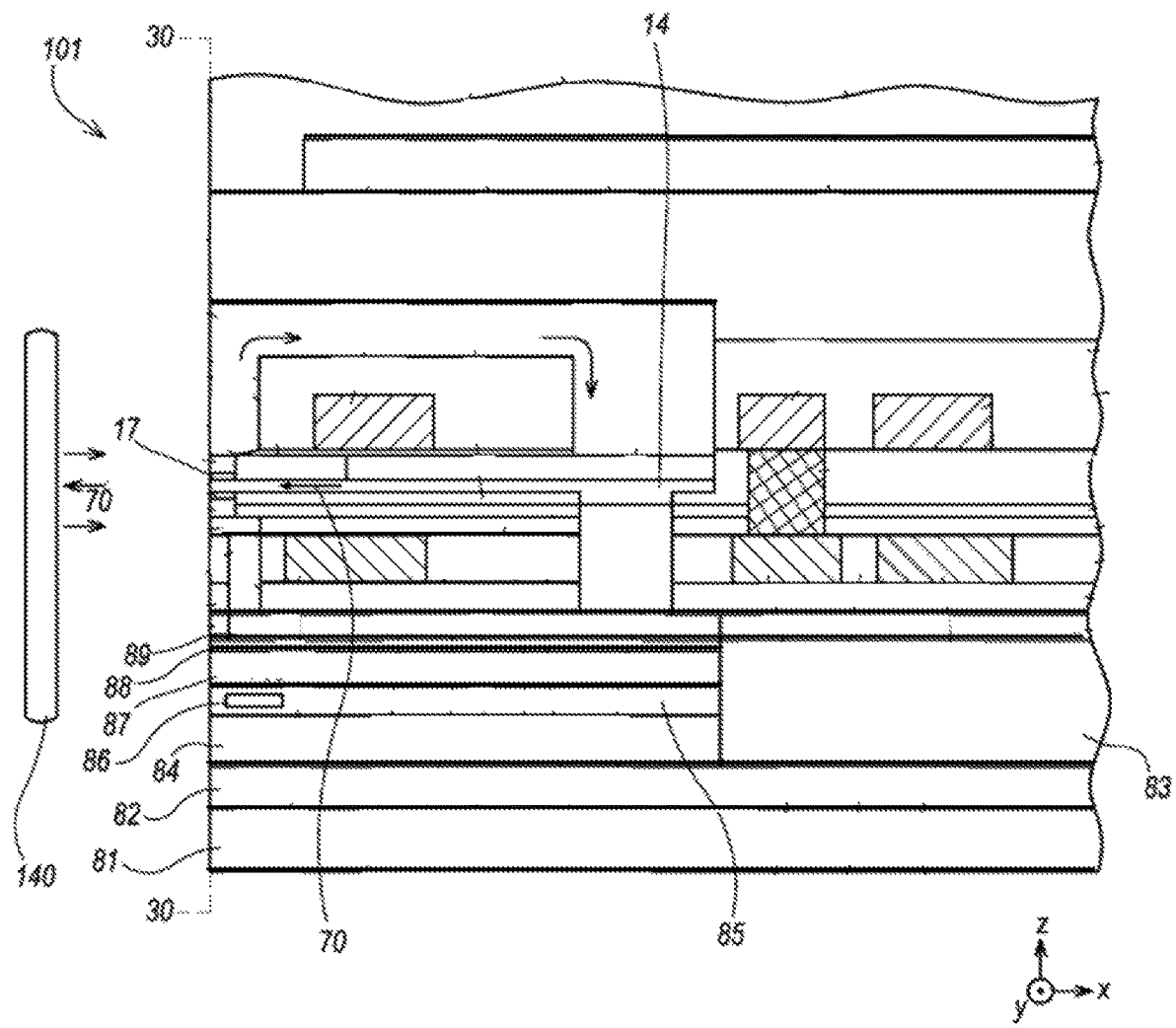
FIG. 4 is a down-track cross-sectional view of a combined read-write head with leading and trailing loop pathways for magnetic flux return to the main pole according to some embodiments of the present disclosure.

Referring to FIG. 4, magnetic recording head 101 comprises a combined read-write head. The read head is formed on a substrate 81 that may be comprised of AlTiC (alumina+ TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

Figure 5A:
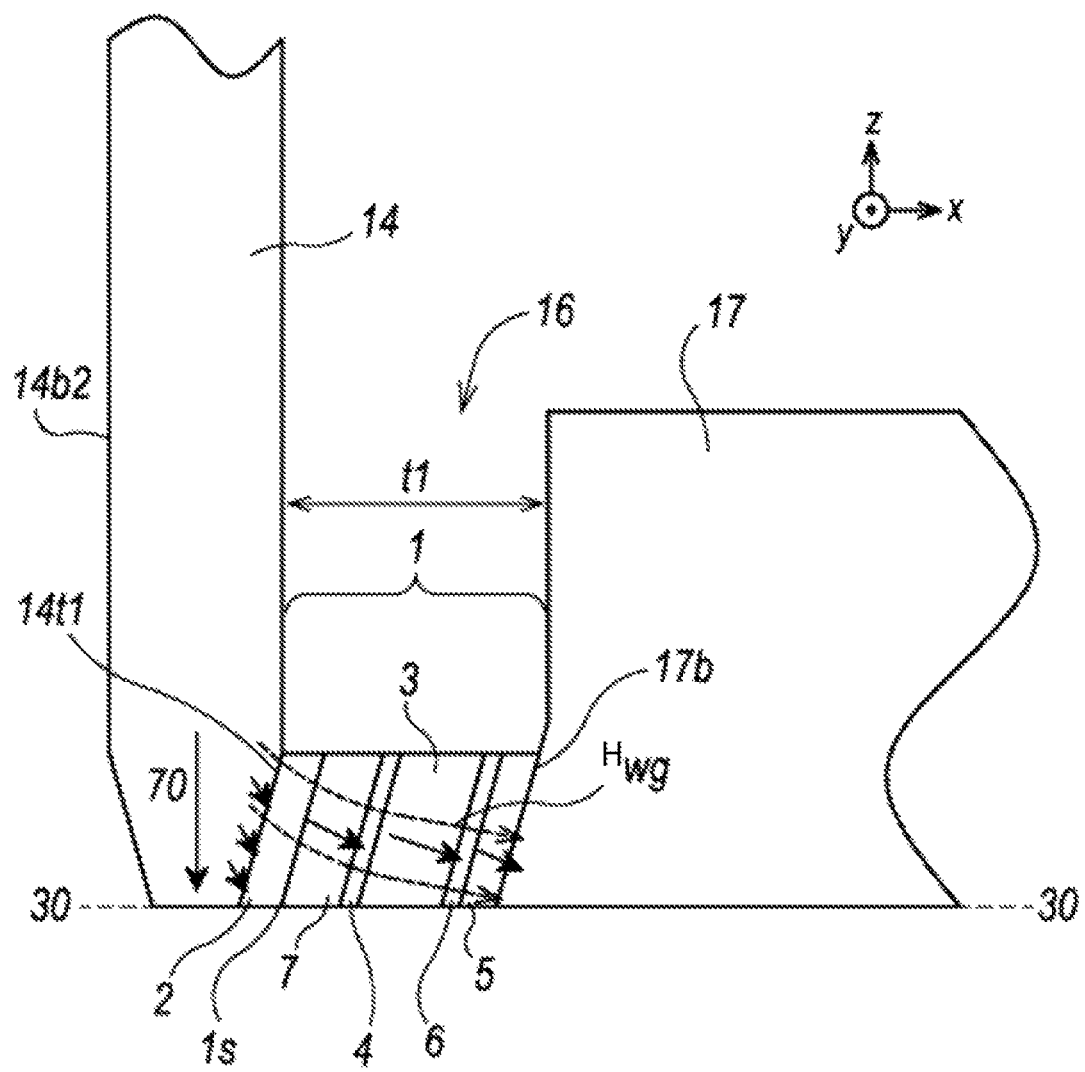
FIG. 5A depicts a STO device known to the inventors.
Figure 5B:
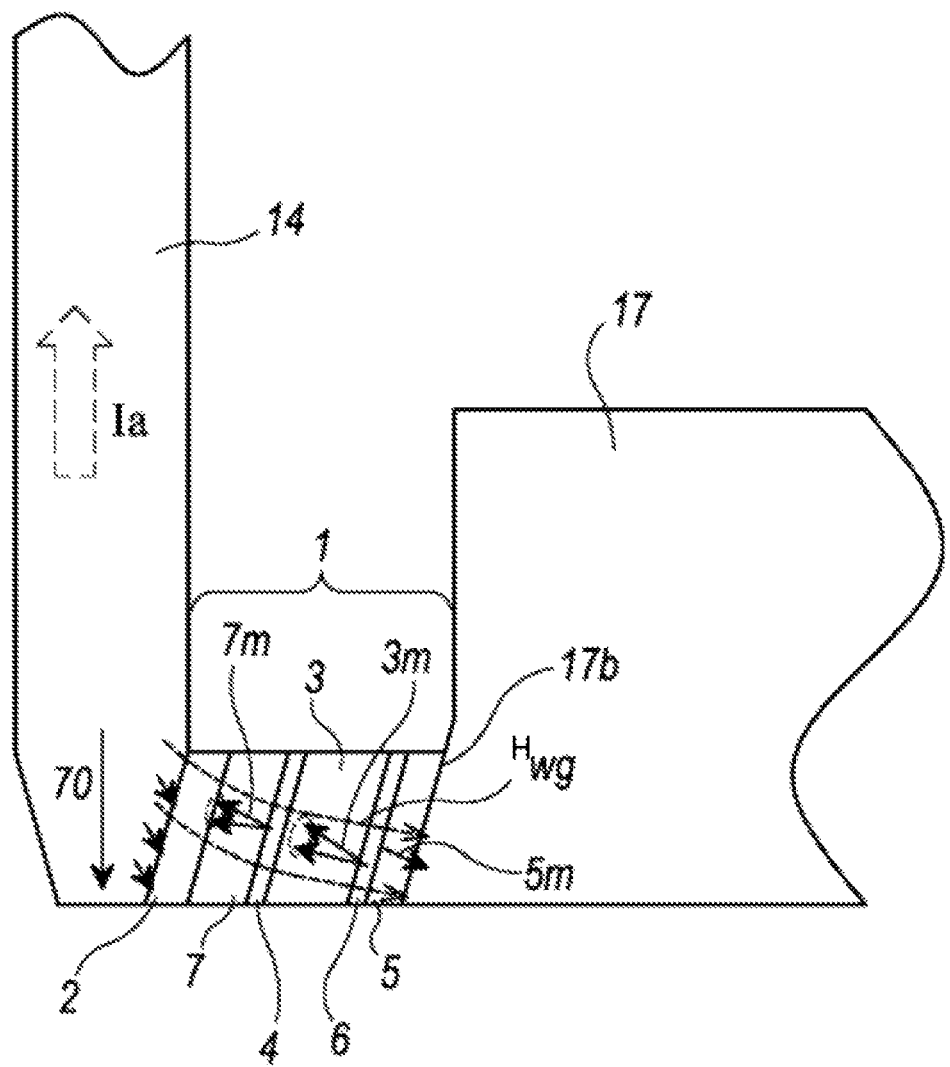
FIG. 5B indicates that the nFGL magnetization is flipped opposite to a WG field direction when a current is applied across the device and the SP layer and SIL provide spin torque on the FGL.

Referring to FIGS. 5A-5B, a writer known to the inventors, and capable of providing a MAMR assist and a STRAMR assist, is depicted. There is a main pole (MP) 14 with a sufficiently large local magnetic field 70 to write the media bit with magnetization on medium. Magnetic flux 70 in the MP proceeds through the ABS 30-30 and into medium bit layer and soft underlayer (SUL). A portion of the flux is collected by trailing shield (TS) 17 and then returns to the MP through a trailing loop. The STO device 1 has a front side Is at the ABS 30-30, and is formed on the MP tapered trailing side 14t1, which connects with a MP top surface that is aligned orthogonal to the ABS. The MP leading side is also tapered and connects with the MP bottom surface 14b2. In other embodiments (not shown), one or both of the MP trailing and leading sides may be orthogonal to the ABS. Write gap field $H_{WG}$ is shown across the STO device in a direction from the MP to trailing shield (TS) 17 during a write semi-cycle in the exemplary embodiments where the write field 70 is pointing down. In other embodiments (not shown) representing another write semi-cycle where write field is pointing up, $H_{WG}$ would point from the TS to the MP. WG 16 has a thickness t1 from MP bottom surface 14b2 to TS side 17b that contacts the STO device. Each of the MP and TS is comprised of a magnetic material such as FeNi, FeCo, FeCoNi, or FeCoN. The MP typically has a saturation magnetization (Ms) value of about 24 kilo Gauss (kG) while the TS has a Ms from 19 kG to 24 kG.

STO device 1 comprises a stack of layers wherein a spin sink (pxL) 2, a first negative spin injection layer (nSIL1) 7, a second non-magnetic spacer (ppL2) 4, a flux guiding layer that has a negative spin polarization (nFGL) 3, a first non-magnetic spacer (ppL1) 6, and a positive spin polarization (pSP) layer 5 are sequentially formed on MP trailing side 14t1, i.e., a STO device 1 having a NNP structure. When the MP magnetic field 70 is pointing down out of the ABS 30-30, magnetizations 7m, 3m, and 5m for the first nSIL 7, nFGL 3, and pSP layer 5, respectively, are all substantially aligned with $H_{WG}$ and pointing toward TS 17 in the absence of an applied current across STO 1.

Referring to FIG. 5B, the STRAMR aspect involves the application of a current (Ia) across STO device 1 and in a direction from TS 17 to MP 14. In an alternative embodiment (not shown) where the order of layers in STO 1 is reversed, then the direction of Ia is also reversed. Thus, the Ia from a DC source is applied through a lead to the TS and through STO device 1 to the MP and then returns through a lead to the DC source.

FIG. 5B shows that when Ia is applied across STO 1 to from TS 17 to MP 14 during a write process, nFGL magnetization 3m flips to a direction substantially opposing $H_{WG}$ and (pSP magnetization 5m). Further, nSIL magnetization 7m can be flipped to be substantially opposing $H_{WG}$. As a result, there is enhancement to WG reluctance and MP write field because magnetizations 7m and 3m oppose $H_{WG}$.

Although the STO device 1 provides a STRAMR effect, a more efficient STO configuration having STRAMR and MAMR assist is desired so that a lower Ia current density may be applied to achieve the same degree of FGL flipping, or so that a higher degree of FGL flipping is achieved at a given Ia current density. Accordingly, improved device reliability and better BER are expected.

Figure 6A:
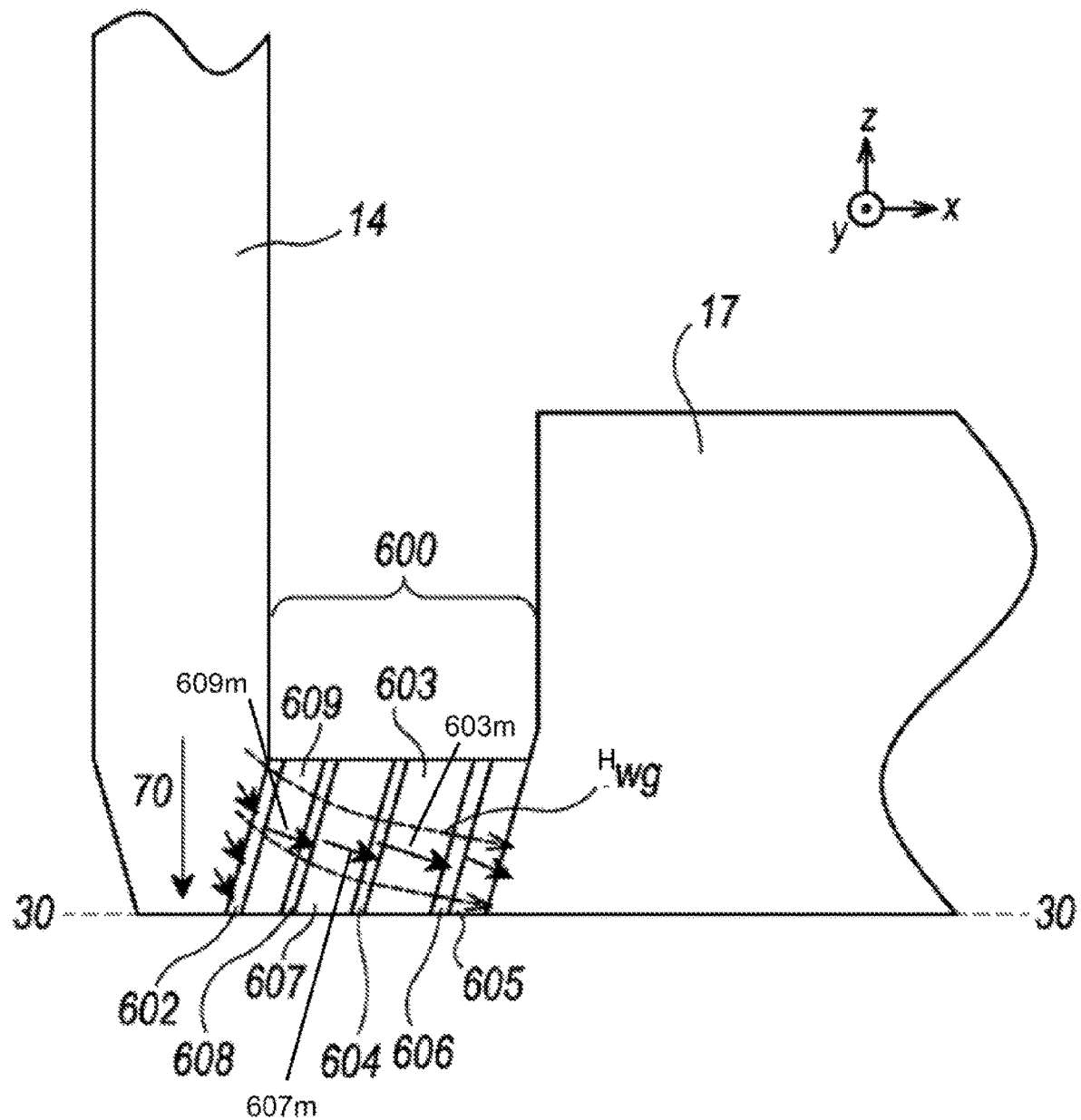
FIG. 6A depicts a STO device according to some embodiments of the present disclosure.
Figure 6B:
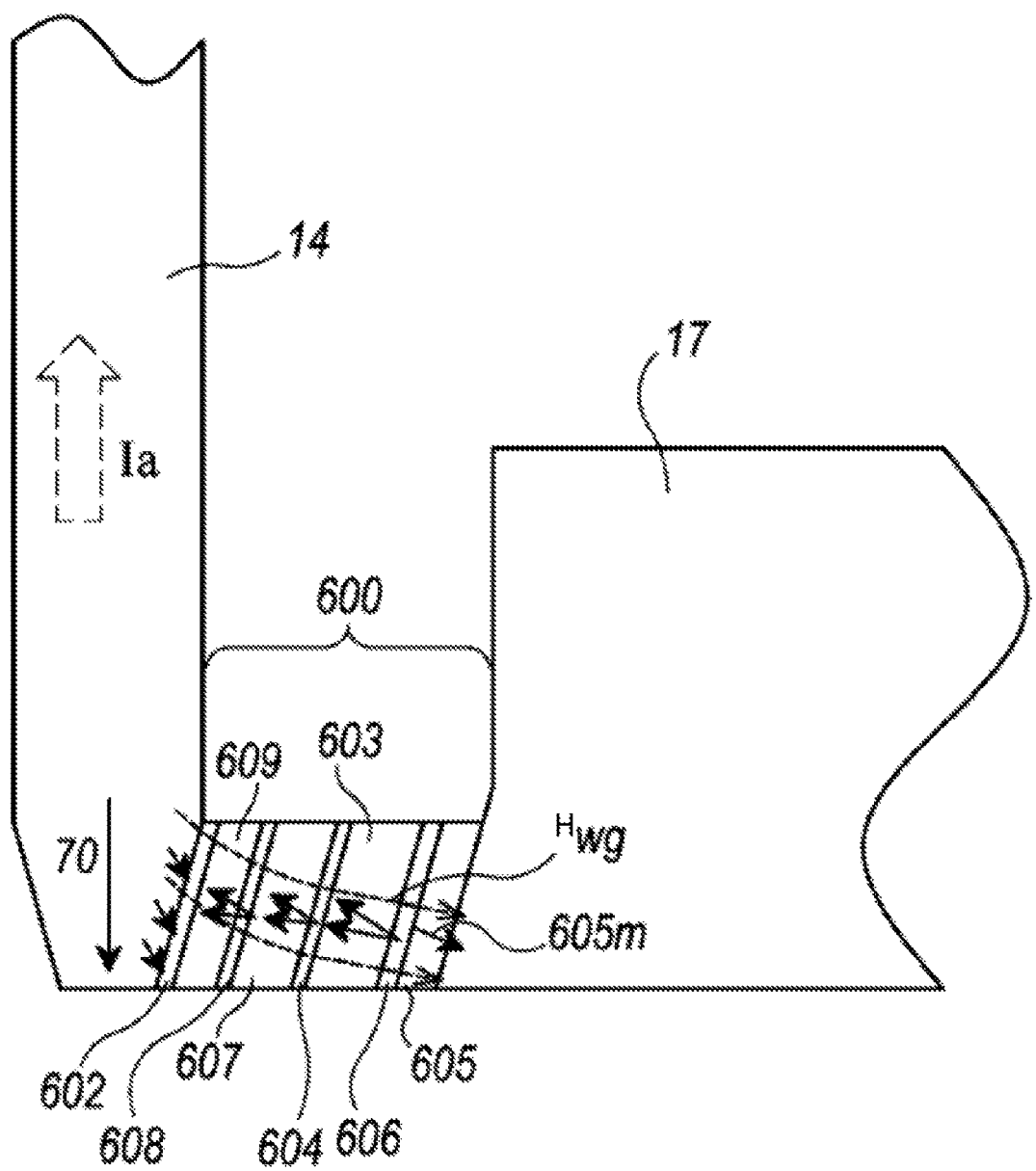
FIG. 6B indicates that the nFGL magnetization is flipped opposite to a WG field direction when a current is applied across the device according to some embodiments of the present disclosure.

As shown in FIGS. 6A-6B, a STO device 600 comprises a stack of layers wherein a spin sink (pxL) 602, a second negative spin injection layer (nSIL2) 609, a third non-magnetic spacer (ppL3) 608, a first negative spin injection layer (nSIL1) 607, a second non-magnetic spacer (ppL2) 604, a flux guiding layer that has a negative spin polarization (nFGL) 603, a first non-magnetic spacer (ppL1) 606, and a positive spin polarization (pSP) layer 605 are sequentially formed on MP trailing side 14t1, i.e., a STO device 600 having a NNNP structure. The pxL 602 is a non-spin polarization preserving layer meaning that electrons have a substantial spin flipping scattering rate such that spin polarization is randomized and the net spin polarization in electrons transiting the pxL is effectively lost. The pxL 602 is an alloy or multilayer made of one or more materials including but not limited to Cr, Ir, NiCr, Ta, W, Pt, Pd, Rh, Ti and Ru. The ppL1 606, ppL2 604, and ppL3 608 are spin polarization preserving layers comprised of one or more non-magnetic materials such as Cu, Au, Ag, Ru, Al, Cr, or V or alloys thereof adjoining one or more magnetic layers (nSIL and/or nFGL) with negative spin polarization (P0). In some embodiments, each of pxL 602, ppL1 606, ppL2 604, and ppL3 608 has a thickness from 1 nm to 4 nm.

In some embodiments, the first nSIL 607 and second nSIL 609 are made of a material with a spin polarization that is negative or weakly positive (in the range of −0.4 to 0.3). In some embodiments, the first nSIL 607 and second nSIL 609 are an alloy of one or more of Fe, Co, and Ni with Cr, V, and Mn, or a multilayer thereof. In some embodiments, the first nSIL 607 and second nSIL 609 may further comprise a dopant such as B, C, or N to improve the reliability of the device.

In some embodiments, the nFGL 603 is made of a material with a spin polarization that is negative or weakly positive (in the range of −0.4 to 0.3). In some embodiments, the nFGL 603 is an alloy of one or more of Fe, Co, and Ni with Cr, V, and Mn, or a multilayer thereof. In some embodiments, the nFGL 603 may further comprise a dopant such as B, C, or N to improve the reliability of the device. When the MP magnetic field 70 is pointing down out of the ABS 30-30, magnetizations 609m, 607m, 603m, and 605m for the first second nSIL 609, the second first nSIL 607, the nFGL 603, and the pSP layer 605, respectively, are all substantially aligned with $H_{WG}$ and pointing toward TS 17 in the absence of an applied current across STO 600.

In some embodiments, each of the first nSIL 607, second nSIL 609, nFGL 603, and pSP layer 605 has a thickness from 2 nm to 4 nm, and a saturation magnetization (Ms) value from 6-15 kG. In some embodiments, the nFGL thickness may be as high as 8 nm, and the pSP layer Ms may be as high as 24 kG. In some embodiments, WG thickness t1 may be 25 nm or less. Preferably, the nSIL saturation magnetization×thickness (Mst) is 1-4 nmT (nm×Tesla product), and the nFGL Mst is >4 nmT and may be as high as 17 nmT. A low nFGL Mst is defined as a moment in the range of 4-8 nmT and a high nFGL Mst is >10 nmT.

In some embodiments, the nFGL 603 has a sufficiently small Ms×thickness (Mst) value and a damping constant less than 0.02 to allow nFGL magnetization 603m to flip to a direction substantially opposite to $H_{WG}$ as a result of spin torque generated by reflected (back scattered) spin polarized electrons from the nSIL and pSP layer.

FIG. 6B shows that when Ia is applied across STO 600 to from TS 17 to MP 14 during a write process, nFGL magnetization 603m flips to a direction substantially opposing $H_{WG}$. Further, nSIL magnetization 609m and 607m can be flipped to be substantially opposing $H_{WG}$. As a result, at the same current density required for FGL magnetization flipping in the STO device 1 according to FIGS. 1A-1B, there is a substantially greater enhancement to WG reluctance and MP write field because magnetizations 609m, 607m, and 603m oppose $H_{WG}$, and the nFGL magnetization is flipped to a greater extent than nFGL magnetization in FIG. 5B.

Figure 8:
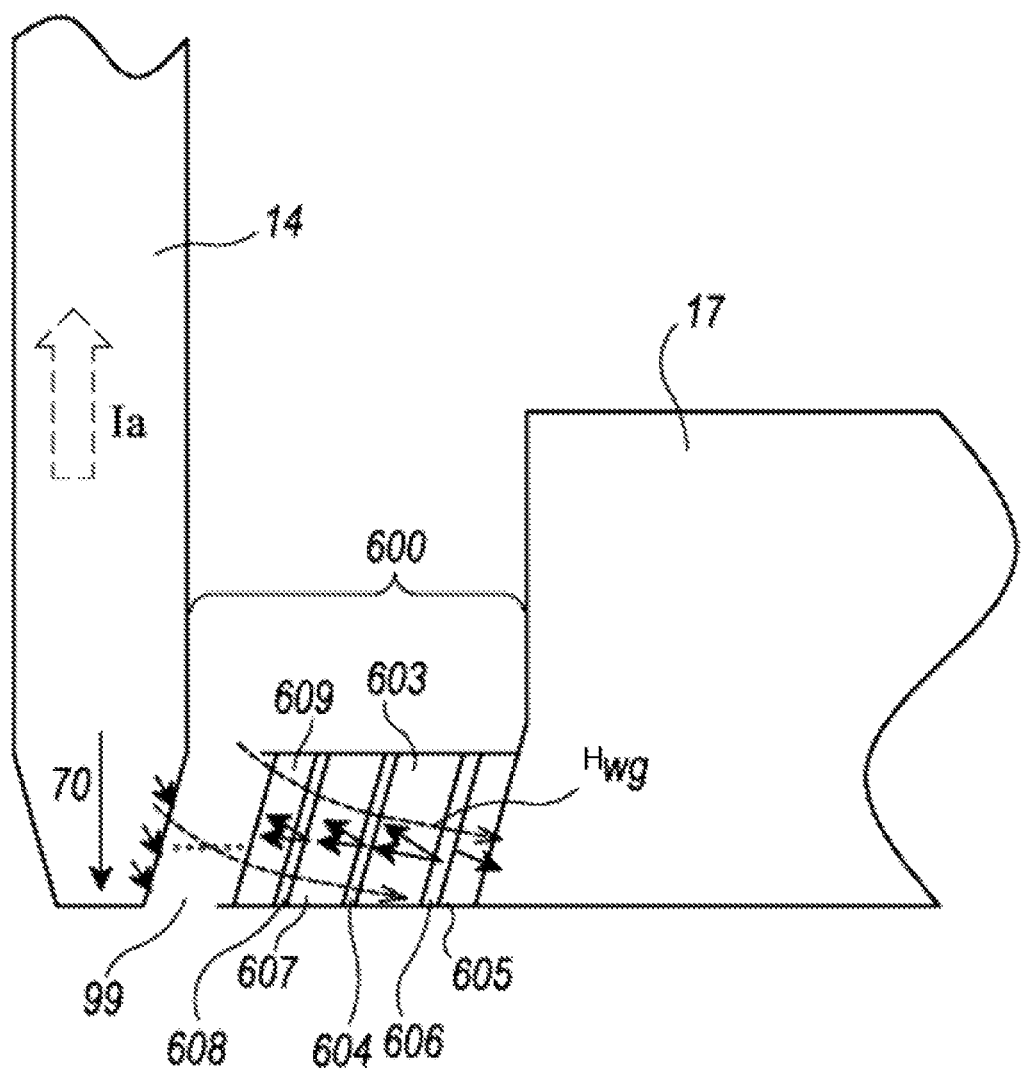
FIG. 8 depicts a STO device according to some embodiments of the present disclosure.

In some embodiments, the STO device 600 can include additional negative spin injection layers (nSILs) between the spin sink (pxL) 602 and the first negative spin injection layer (nSIL) 607 as shown in FIG. 8. However, accommodating additional negative spin injection layers (nSILs) is limited by the write gap thickness. That is, if the write gap thickness is increased, the writer performance would be significantly degraded. As discussed herein, in some embodiments, the WG thickness t1 may be 25 nm or less.

In some embodiments, the STO device 600 can include an additional non-magnetic spacer (ppL) to separate an additional nSIL from the second negative spin injection layer (nSIL2) 606. In some embodiments, the STO device 600 can include a stack of layers wherein a spin sink (pxL) 602, a third negative spin injection layer (nSIL3), a fourth non-magnetic spacer (ppL4), a second negative spin injection layer (nSIL2) 609, a third non-magnetic spacer (ppL3) 608, a first negative spin injection layer (nSIL1) 607, a second non-magnetic spacer (ppL2) 604, a flux guiding layer that has a negative spin polarization (nFGL) 603, a first non-magnetic spacer (ppL1) 606, and a positive spin polarization (pSP) layer 605 are sequentially formed on MP trailing side 14t1, i.e., a STO device 600 having a NNNNP structure. The layers can be composed of materials previously discussed herein with respect to STO device 600 having a NNNP structure.

In some embodiments, under zero current, all magnetic layers should be aligned along the gap field direction as shown in FIG. 6A. Under the current direction where positive current flows from the TS to the MP, electrons back scattered by the pSP has the spin moment opposite to that of the pSP local moment, i.e., against the gap field direction. Such spin moment is transferred to the nFGL, and at a large enough current density, the nFGL will be flipped to a cone angle that is against the gap field shown in FIG. 6B. At the same time, the spin transfer from the nFGL back to the pSP will stabilize the pSP magnetization so that the spin torque efficiency from the pSP to the nFGL is better than the pSP and pFGL pair that is typically used in a conventional STRAMR design (PP structure). The mutual spin transfer would lock the pSP and nFGL layers in an antiparallel state under the current polarity.

In some embodiments, at a further higher current density, spin transfer from the flipped nFGL to the second nSIL would also flip the magnetization of the second nSIL towards the direction against the gap field. Although the nSIL and nFGL pair would not be in a locked state, both layers being aligned against the gap field direction is still a relatively stable state. A writer is driven by an GHz frequency coil current so that the MP/TS/gap field directions are also modified by coil current polarity. Thus, the unlocked pair between the nSIL and the nFGL would can allow the magnetic layers to be quickly switched against the gap field, which is particularly advantageous when the gap field is alternating at a high frequency (GHz) limit.

At an even high current density, spin transfer from the second nSIL to the first nSIL would flip magnetization of the first nSIL towards the opposite direction. The total flipped moment of all layers to assist the write field enhancement is higher than that of a conventional STRAMR having a PP structure and the STO device 1 having a NNP structure.

Figure 9A:
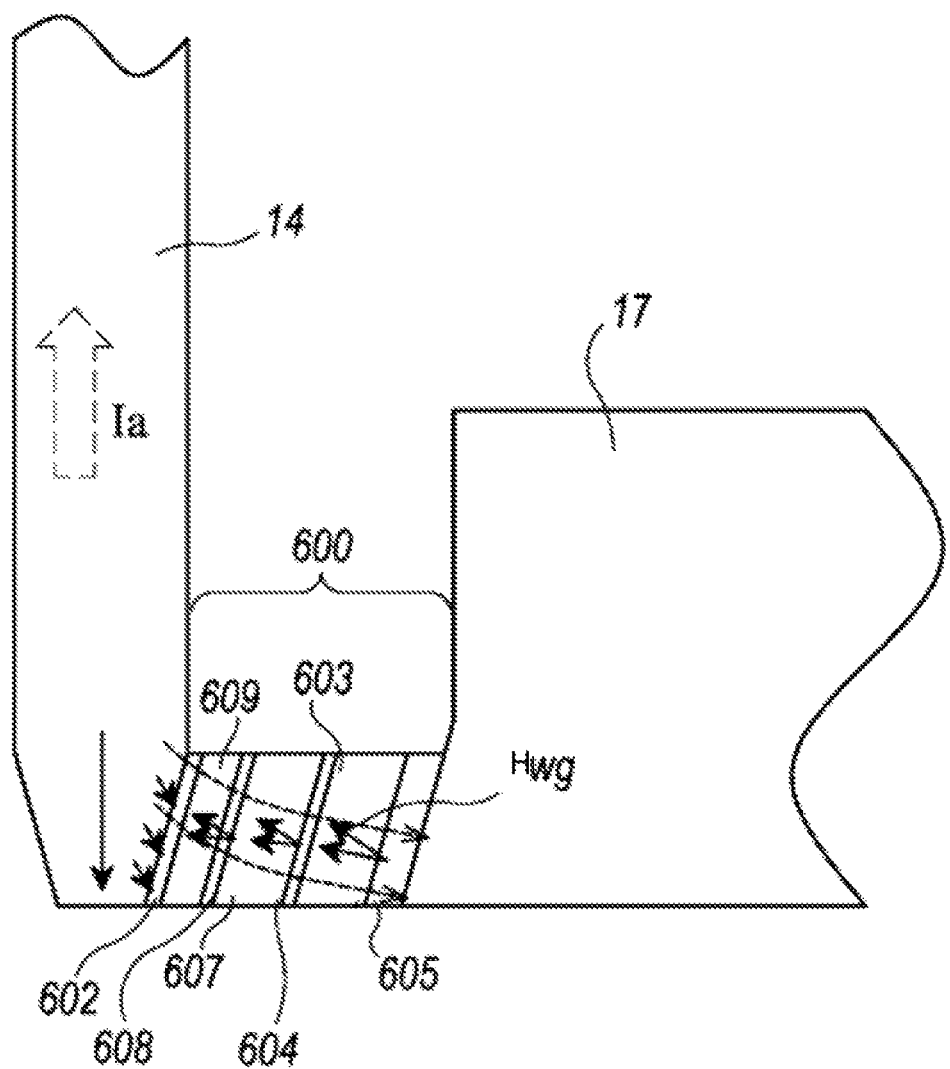
FIG. 9A depicts a STO device according to some embodiments of the present disclosure.
Figure 9B:
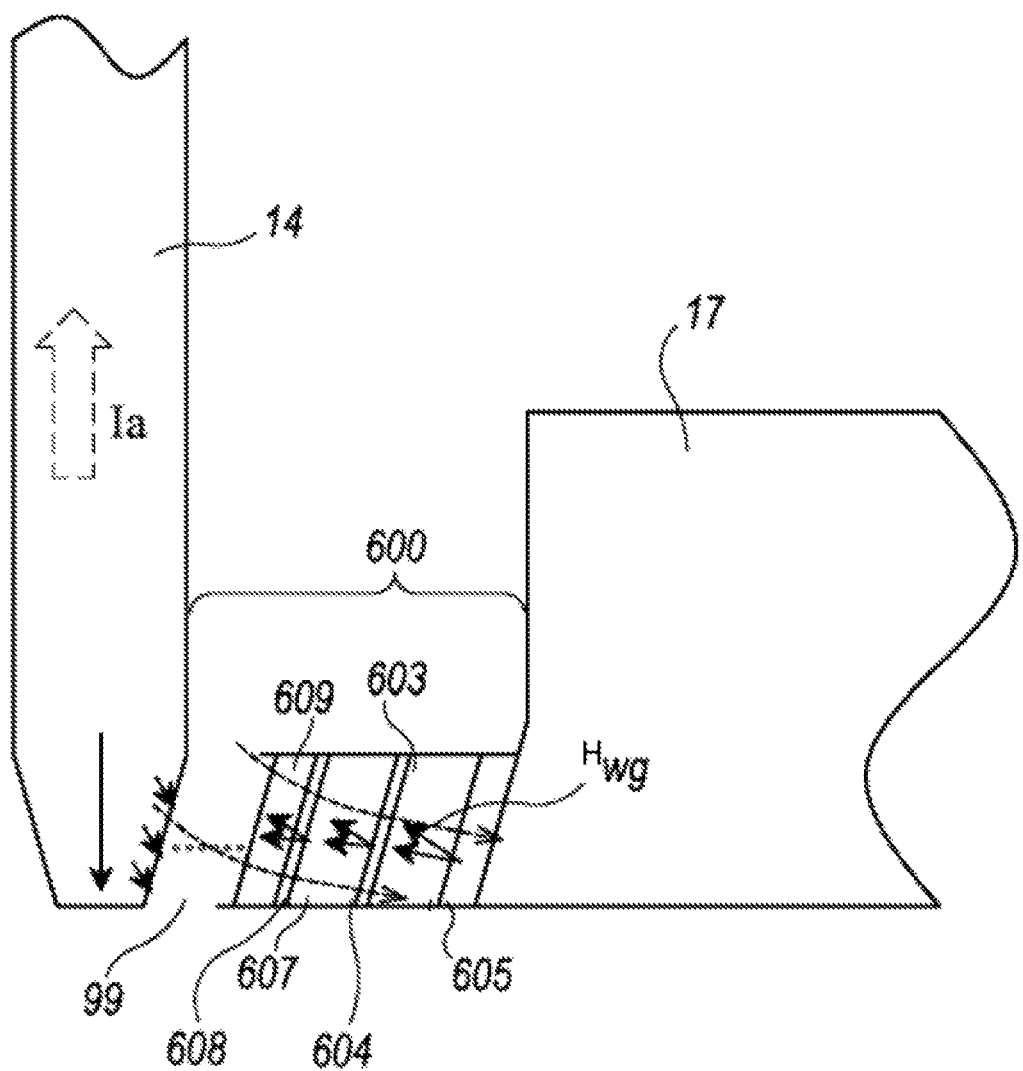
FIG. 9B depicts a STO device according to some embodiments of the present disclosure.
Figure 10A:
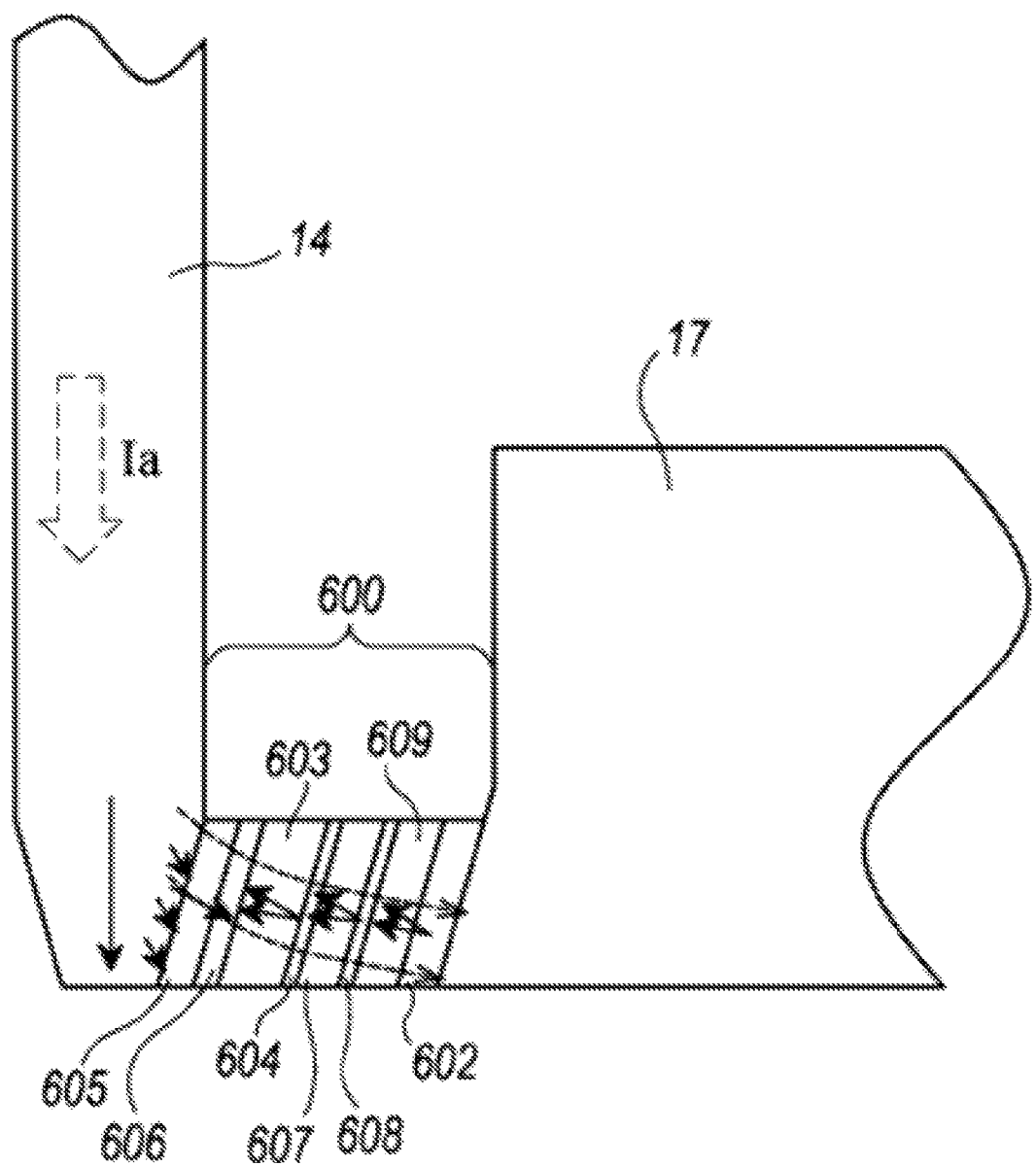
FIG. 10A depicts a STO device according to some embodiments of the present disclosure.
Figure 10B:
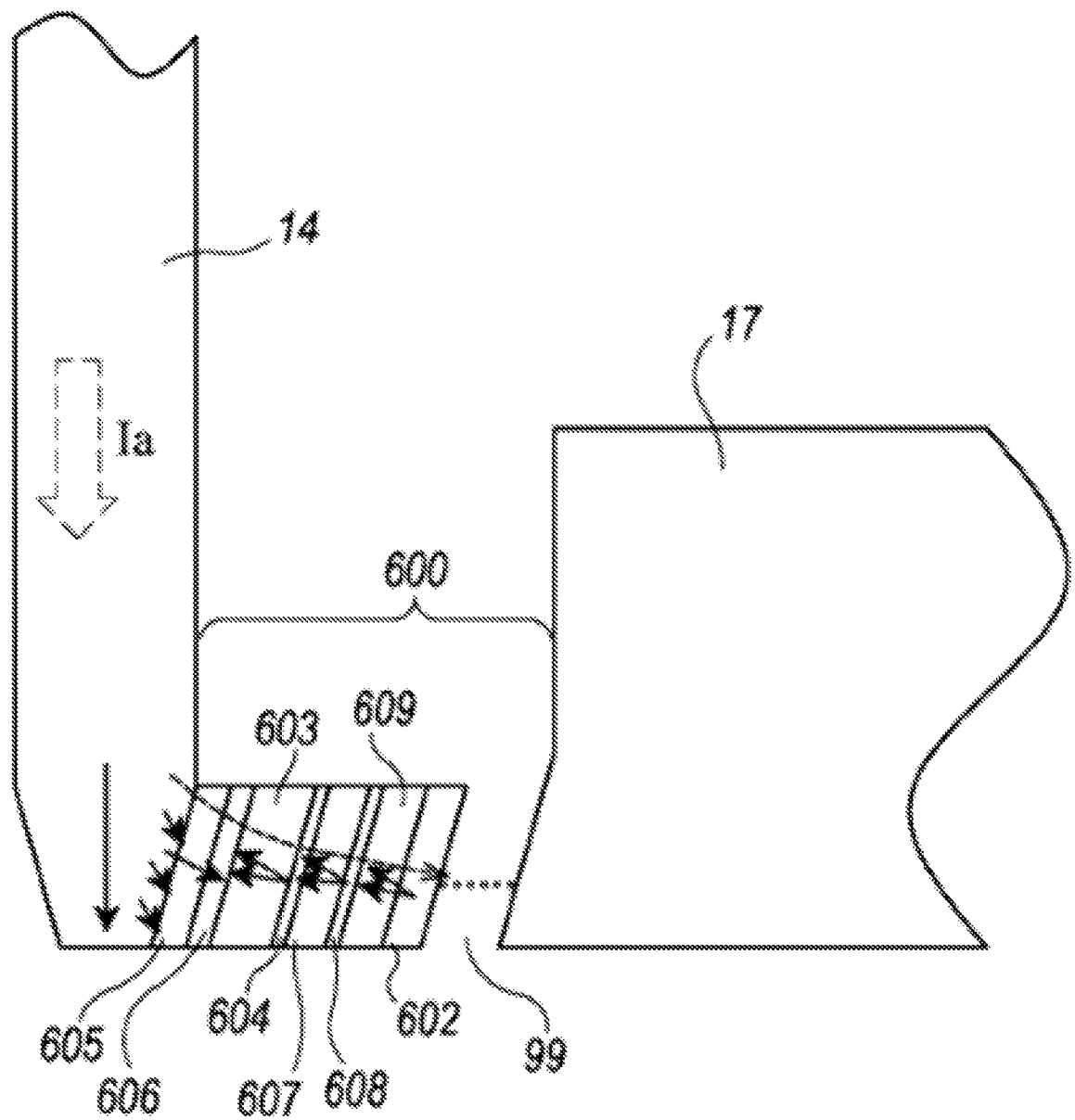
FIG. 10B depicts a STO device according to some embodiments of the present disclosure.

In some embodiments, the STO device 600 can have a NNNP structure as shown in FIG. 6A. In some embodiments, the STO device 600 can have a NNNNP structure as shown in FIG. 8, wherein the gap 99 includes the pxL, an additional nSIL, and an additional ppL in sequential order. In some embodiments, the STO device 600 as shown in FIG. 8 can accommodate more separated magnetic layers in gap 99 than a NNNNP structure. In some embodiments, the pSP is merged with the TS layer 17 as shown in FIG. 9A, providing a NNN-like design. In some embodiments, the pSP is merged with the TS layer as shown in FIG. 9B, providing a NNNN-like design, wherein the gap 99 includes the pxL, an additional nSIL, and an additional ppL in sequential order. In some embodiments, the pSP is coupled to the MP (the order of layers in the STO are reversed) and the current direction is reversed as shown in FIG. 10A. In some embodiments, the pSP is coupled to the MP with multiple nSIL layers (e.g., a NNNNP structure) as shown in FIG. 10B. In some embodiments, the STO device 600 can have a NNNNP structure as shown in FIG. 10B, wherein the gap 99 includes the pxL, an additional nSIL, and an additional ppL in sequential order. In some embodiments, the STO device 600 as shown in FIG. 10B can accommodate more separated magnetic layers in gap 99 than a NNNNP structure. In some embodiments, the pSP is merged with the MP layer, providing a NNN-like design. In some embodiments, the pSP is merged with the MP layer, providing a NNNN-like design. Other features of such embodiments would otherwise be the same as discussed with respect to FIGS. 6A-B.

Figure 11A:
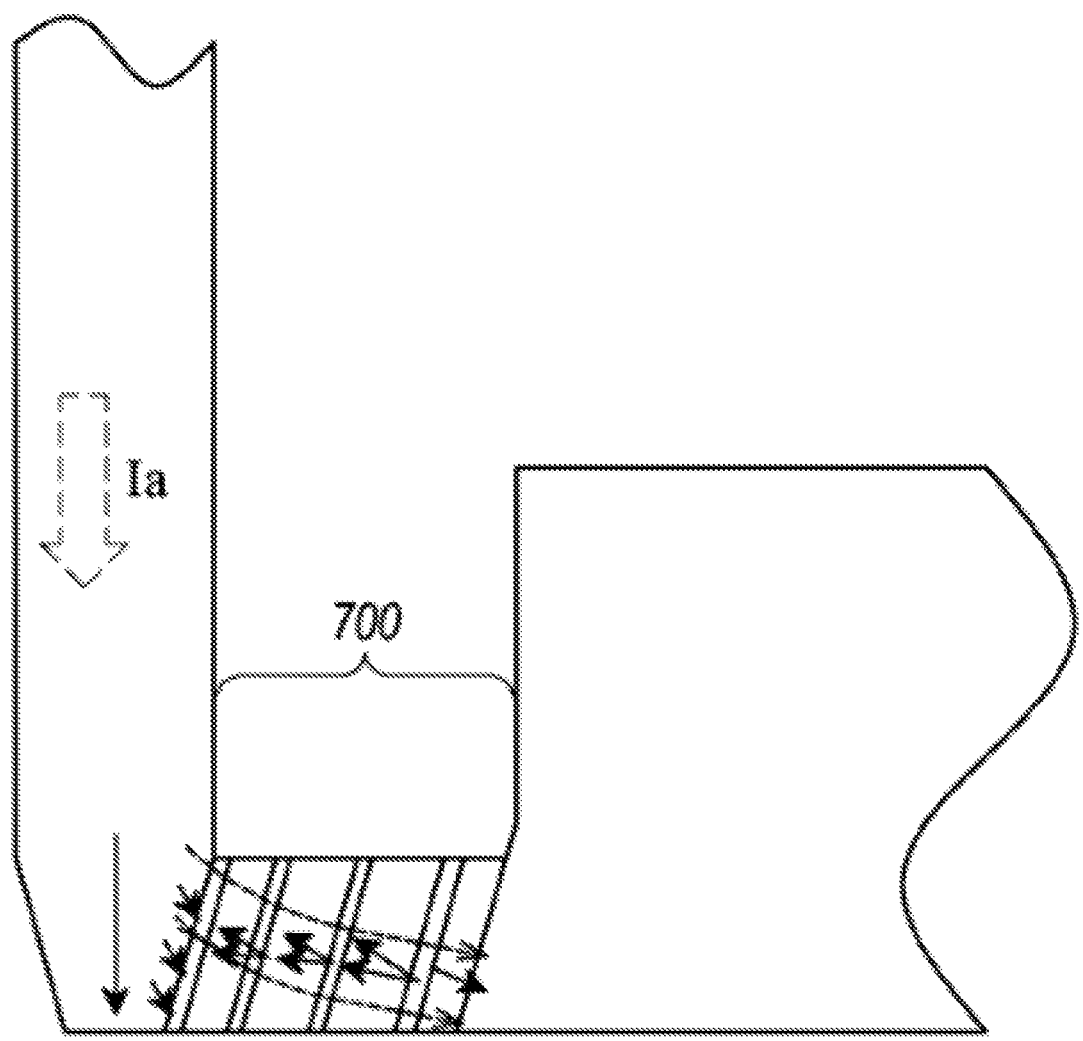
FIG. 11A depicts a STO device according to some embodiments of the present disclosure.
Figure 11B:
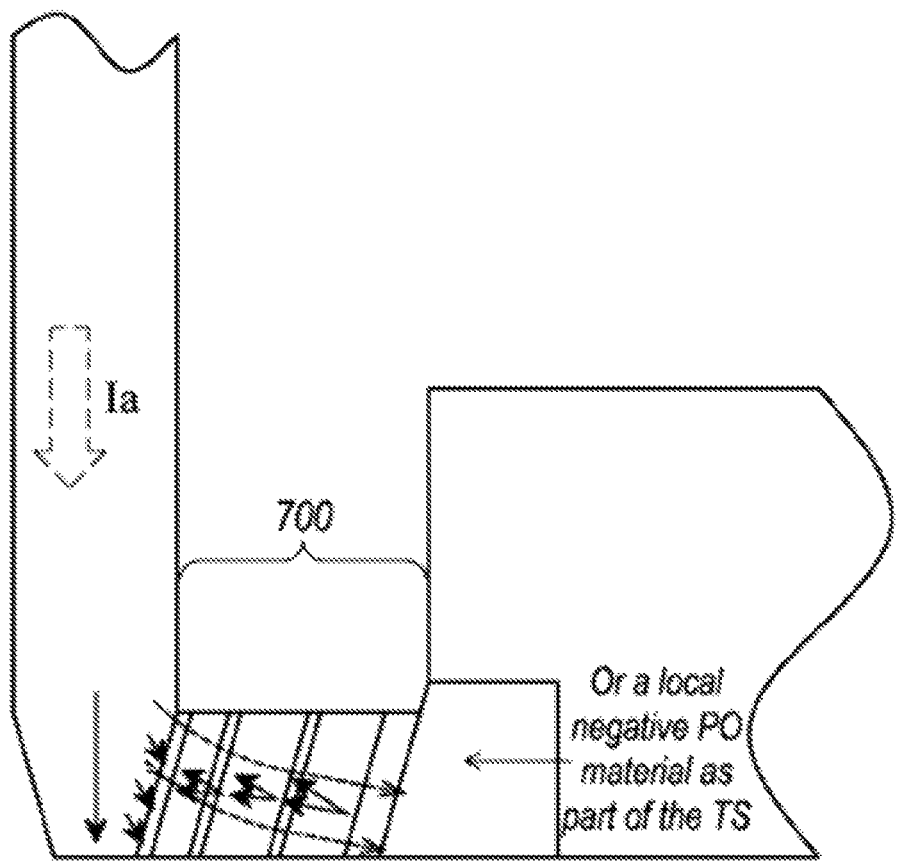
FIG. 11B depicts a STO device according to some embodiments of the present disclosure.

In some embodiments, the current polarity and the spin polarization of the materials can be reversed, e.g., in the previously described embodiments. As shown in FIG. 11A, the current polarity and the spin polarization of the materials of a STO having a NNNP structure are reversed, providing a STO device 700 having a PPPN structure. As shown in FIG. 11B, the current polarity and the spin polarization of the materials of a STO 700 having a NNN-like design (in which the pSP is merged with the TS layer) are reversed, providing a PPP-like design. In these embodiments, the outgoing spin polarization from the nSP needs to be negative. Other features of such embodiments would otherwise be the same as discussed with respect to FIGS. 6A-B.

Figure 7B:
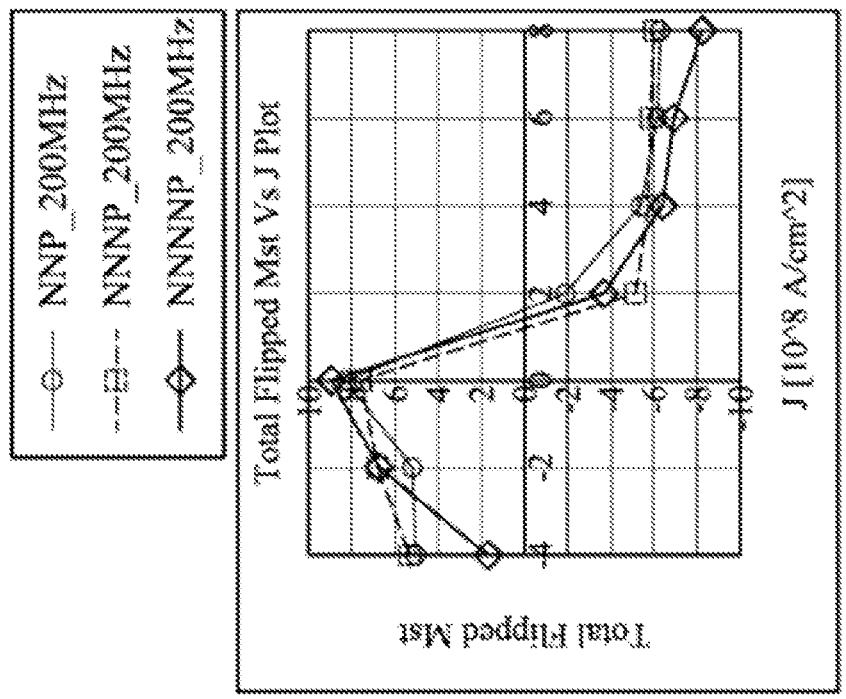
FIGS. 7A-B show a diagram of effective total magnetic moment along the gap field of different saturation magnetization×thickness (Mst) combinations for STO devices according to some embodiments of the present disclosure, with a 200 MHz low frequency write-coil current (FIG. 3A) and 1 GHz high frequency write-coil current (FIG. 3B).
Figure 7A:
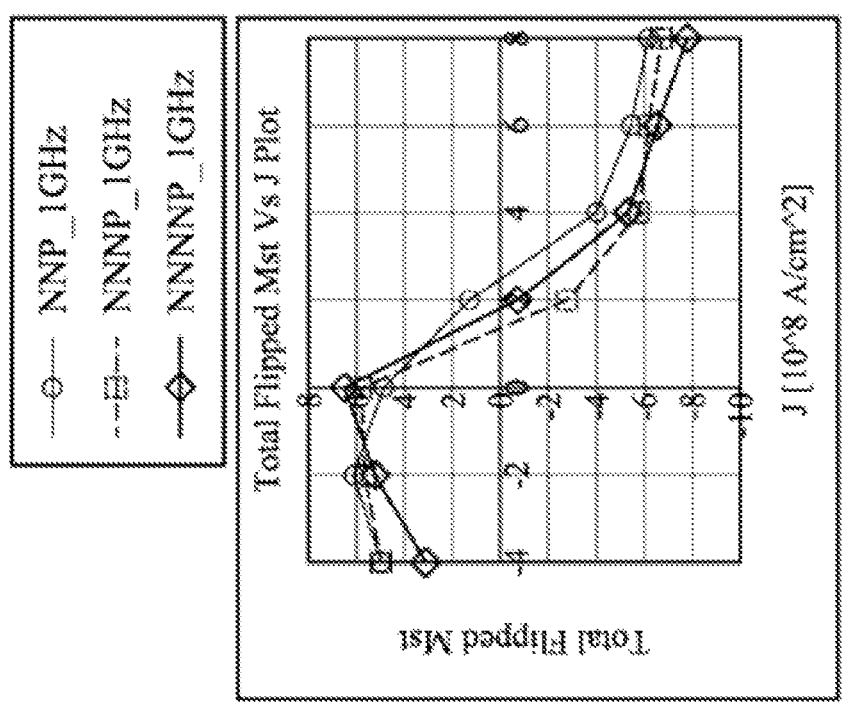

FIGS. 7A-B show a diagram of effective total magnetic moment along the gap field of different Mst combinations for a STO device having a NNNP structure compared to that of a STO device 1 having a NNP structure, with a 200 MHz low frequency write-coil current (FIG. 7A) and 1 GHz high frequency write-coil current (FIG. 7B). It is clear that at lower frequency (FIG. 7A), a NNNP structure has more flipped (further negative) moment against the gap field particularly at relatively low current density $J=2\sim4\times10^8$ A/cm$^2$. But, at higher current density, the total degree of flipping is similar to that of the NNP structure. On the other hand, at higher frequency (1 GHz) (FIG. 7B), a NNNP structure is better than a NNP structure in the entire current density range. Without being bound to any particular theory, FIGS. 7A-B show that (1) at a low write-coil current frequency, a NNNP structure can assist more than NNP structure, which is already more than that of the conventional STRAMR; (2) to achieve the same degree of flipping, a NNNP structure would require less current density applied in the device, which improves its device reliability; and (3) at a high write-coil current frequency, a NNNP structure is better than a NNP structure in the entire current density range.

FIGS. 7A-B also show a diagram of effective total magnetic moment along the gap field of different Mst combinations for a STO device having a NNNNP structure compared to STO devices having a NNP structure and NNNP structure, respectively, with a 200 MHz low frequency write-coil current (FIG. 7A) and 1 GHz high frequency write-coil current (FIG. 7B). The degree of flipping is lower than that of a STO device having a NNNP structure at a low current density ($J=2\times10^8$ A/cm$^2$), but the degree of flipping is more than that of a STO device having a NNNP structure at a high current density ($J>6\times10^8$ A/cm$^2$). At current operational current density ($J=4\times10^8$ A/cm$^2$), performance is close to that of a STO device having a NNNP structure, but higher degree of flipping can be achieved if higher current density is affordable.

TABLE 1

| Design | Eff Mst Perp 200 MHz | Eff Mst Perp 1 GHz | Eff Mst IP 200 MHz | Eff Mst IP 1 GHz | ADC over STRAMR PP (%) |
|---|---|---|---|---|---|
| STRAMR PP | −3.58 | −3.07 | 0.16 | 0.55 | 0.0 |
| NNP | −5.41 | −4.01 | 2.17 | 2.32 | 2.2 |
| NNNP | −5.72 | −5.78 | 1.93 | 1.79 | 2.8 |
| NNNNP | −6.37 | −5.36 | 1.88 | 2.44 | 3.0 |

Table 1 shows the performance gain calculated at fixed current density $4\times10^8$ A/cm$^2$, of the STO devices having the NNNP structure and NNNNP structure relative to the STRAMR having a PP structure and the STO device having a NNP structure. The 2$^{nd}$ and 3$^{rd}$ columns are the effective Mst values along the write gap, in which a higher negative number represents more STRAMR assist. The STO device having a NNNP structure has a flipped moment that is >2 nmT better than the conventional STRAMR with PP structure and also better than that of STO device having the NNP structure. The 4$^{th}$ and 5$^{th}$ columns describe the in-plane component associated with MAMR assist. The STO device having the NNNP structure demonstrates higher effective Mst values at low and high frequencies than that of a conventional STRAMR having a PP structure. The STO device having the NNNP structure demonstrates slightly lower effective Mst values at low and high frequencies than that of a STO device having a NNP structure. Finally, in the last column, the STO device having the NNNP structure is estimated to improve area density capability (ADC) by ~3% than that of a conventional STRAMR with a PP structure. This ADC performance gain is confirmed in wafer testing. The STO device having the NNNNP structure also demonstrates a similar level of performance as the STO device having the NNNP structure due to the limit of the total Mst that can be accommodated in the limited write gap thickness. Further gain that can be achieved by accommodating additional nSIL layers is likely to be saturated at structures with around five separated magnetic layers.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A method of manufacturing a transfer torque reversal assisted magnetic recording (STRAMR) structure, the method comprising:
   providing a main pole (MP) that is configured to generate a write field which is directed through a pole tip at an air bearing surface (ABS), and to generate a write gap (WG) field in a down-track direction across a spin torque oscillator (STO) device in a WG, and between a MP trailing side and a trailing shield (TS);
   disposing the trailing shield (TS) with a side at the ABS, and a bottom surface facing the MP; and
   providing the STO device, comprising:
      (1) a flux guiding layer that has a negative spin polarization (nFGL), wherein the nFGL comprises a magnetization pointing substantially parallel to the WG field without a current bias and formed between a first spin polarization preserving layer (ppL1) and a second spin polarization preserving layer (ppL2);
      (2) a positive spin polarization (pSP) layer that adjoins the TS bottom surface;
      (3) a non-spin polarization preserving layer (pxL) contacting the MP trailing side;
      (4) a first negative spin injection layer (nSIL1) between the ppL2 and a third spin polarization preserving layer (ppL3); and
      (5) a second negative spin injection layer (nSIL2) between the ppL3 and the pxL, wherein the nFGL, nSIL1, and nSIL2 have a spin polarization that is negative; and
   applying a direct current (DC) of sufficient current density (J) from the TS to MP across the STO device, wherein the magnetization of the nFGL is configured to flip to a direction substantially antiparallel to the WG field, wherein the nSIL1 and nSIL2 are configured to exert an additive spin torque on the nFGL to cause a magnetization of the nFGL to flip to a direction substantially antiparallel to the WG field thereby increasing reluctance in the WG and enhancing the write field, and wherein the nSIL1 and nSIL2 have a saturation magnetization×thickness (Mst) product substantially less than that of the nFGL.

2. The method of claim 1 wherein the pxL is an alloy or multilayer made of one or more of Cr, Ir, NiCr, Ta, W, Pt, Pd, Rh, Ti and Ru such that a net spin polarization in electrons transiting the pxL is effectively lost.

3. The method of claim 1 wherein the ppL1, the ppL2, and the ppL3 are one or more of Cu, Au, Ag, Ru, Al, Cr, V, or alloys thereof, and have sufficient spin diffusion length to allow spin polarization in essentially an unaltered orientation for electrons traversing through the ppL1, the ppL2, and the ppL3.

4. The method of claim 1 wherein at least one of the nSIL1, the nSIL2, and the nFGL is a negative spin polarization material with a spin polarization from −0.4 to 0, and is made of an alloy that is of one or more of Fe, Co, and Ni with Cr, V, and Mn, or a multilayer thereof.

5. The method of claim 1 wherein the pSP layer has a magnetization ferromagnetically coupled to the TS, and substantially aligned in the WG field direction with or without an application of a direct current (DC) voltage across the STO device.

6. The method of claim 1 wherein each of the pSP layer, the nFGL, the nSIL1, and the nSIL2 have a saturation magnetization (Ms) from 6 kiloGauss (kG) to 15 KG, and a thickness from 1 to 4 nm.

7. The method of claim 1 wherein the STO device has a pxL/nSIL2/ppL3/nSIL1/ppL2/nFGL/ppL1/pSP layer configuration.

8. The method of claim 1, wherein the STRAMR structure is part of a head gimbal assembly, and wherein the method further comprises:
disposing a suspension that elastically supports the STRAMR structure, wherein the suspension has a flexure to which the STRAMR structure is joined, a load beam with one end connected to the flexure, and a base plate connected to another end of the load beam.

9. The method of claim 2, wherein the STRAMR structure is part of a magnetic recording apparatus and wherein the method further comprises:
disposing a magnetic recording medium positioned opposite to a slider on which the STRAMR structure is formed;
disposing a spindle motor that rotates and drives the magnetic recording medium; and
disposing a device that supports the slider, and that positions the slider relative to the magnetic recording medium.

10. A method comprising:
providing a spin transfer torque reversal assisted magnetic recording (STRAMR) structure, comprising:
(a) a main pole (MP) that is configured to generate a write field which is directed through a pole tip at an air bearing surface (ABS);
(b) a trailing shield (TS) with a side at the ABS, and a bottom surface facing the MP; and
(c) a spin torque oscillator (STO) device, comprising:
(1) a flux guiding layer with a negative spin polarization (nFGL), wherein the nFGL has a magnetization substantially parallel to a field of a write gap (WG) without a current bias, and is formed between a first spin polarization preserving layer (ppL1) and a second spin polarization preserving layer (ppL2);
(2) a positive spin polarization (pSP) layer that adjoins a MP trailing side;
(3) a non-spin polarization preserving layer (pxL) contacting the TS;
(4) a first negative spin injection layer (nSIL1); and
(5) a second negative spin injection layer (nSIL2), wherein the nFGL, nSIL1, and nSIL2 have a spin polarization that is negative; and
applying a direct current (DC) of sufficient current density (J) from the TS to MP across the STO device, wherein the magnetization of the nFGL is configured to flip to a direction substantially antiparallel to the WG field, wherein the nSIL1 and nSIL2 exert an additive spin torque on the nFGL to cause a magnetization of the nFGL to flip to a direction substantially antiparallel to the WG field thereby increasing reluctance in the WG and enhancing the write field, wherein the nSIL1 and nSIL2 have a saturation magnetization×thickness (Mst) product substantially less than that of the nFGL.

11. The method of claim 10, wherein the MP is configured to generate the field of the WG in a down-track direction across the spin torque oscillator (STO) device in the WG, and between the MP trailing side and the trailing shield (TS).

12. The method of claim 10, wherein the nSIL1 is between the ppL2 and a third spin polarization preserving layer (ppL3), and wherein the nSIL2 is between the ppL3 and the pxL.

13. The method of claim 10, wherein the STRAMR structure is part of a head gimbal assembly (HGA), and wherein the method further comprises:
disposing a suspension that elastically supports the STRAMR structure, wherein the suspension has a flexure to which the STRAMR structure is joined, a load beam with one end connected to the flexure, and a base plate connected to another end of the load beam.

14. The method of claim 10, wherein the STRAMR structure is part of a magnetic recording apparatus, and wherein the method further comprises:
disposing a magnetic recording medium positioned opposite to a slider on which the STRAMR structure is formed;
disposing a spindle motor that rotates and drives the magnetic recording medium; and
disposing a device that supports the slider, and that positions the slider relative to the magnetic recording medium.

* * * * *